United States Patent
Lehoux-Lebacque et al.

(10) Patent No.: US 12,264,921 B2
(45) Date of Patent: Apr. 1, 2025

(54) METHOD FOR PREPROCESSING A SET OF FEASIBLE TRANSFERS FOR COMPUTING ITINERARIES IN A MULTIMODAL TRANSPORTATION NETWORK

(71) Applicant: Naver Corporation, Seongnam-si (KR)

(72) Inventors: Vassilissa Lehoux-Lebacque, Corenc (FR); Darko Drakulic, Grenoble (FR)

(73) Assignee: Naver Corporation (KR)

( * ) Notice: Subject to any disclaimer, the term of this patent is extended or adjusted under 35 U.S.C. 154(b) by 405 days.

(21) Appl. No.: 16/830,609

(22) Filed: Mar. 26, 2020

(65) Prior Publication Data

US 2020/0378772 A1 Dec. 3, 2020

(30) Foreign Application Priority Data

May 29, 2019 (EP) .................................... 19305687

(51) Int. Cl.
*G01C 21/34* (2006.01)
*G06Q 10/047* (2023.01)
*G06Q 50/14* (2012.01)

(52) U.S. Cl.
CPC ....... *G01C 21/3423* (2013.01); *G01C 21/343* (2013.01); *G01C 21/3446* (2013.01);
(Continued)

(58) Field of Classification Search
CPC .............. G01C 21/3423; G01C 21/343; G01C 21/3446; G01C 21/3453; G01C 21/3811;
(Continued)

(56) References Cited

U.S. PATENT DOCUMENTS 5,991,688 A 11/1999 Fukushima et al.
6,779,060 B1 8/2004 Azvine et al.
(Continued)

FOREIGN PATENT DOCUMENTS

EP 3339806 A1 6/2018
EP 3683742 7/2020
(Continued)

OTHER PUBLICATIONS

Multimodal_route_and_tour_planning_in_urban_environments.pdf (Year: 2017).*
(Continued)

*Primary Examiner* — Thomas Ingram
*Assistant Examiner* — Faris Asim Shaikh
(74) *Attorney, Agent, or Firm* — Michael J. Nickerson (57) ABSTRACT

A method for preprocessing a set of feasible transfers within a multimodal transportation network of predetermined stations, comprising, for each trip in the multimodal transportation network hereafter called origin trip: (a) for each station ($p_t^i$) of the origin trip (t), computing at this station ($p_t^i$) an earliest arrival/change time associated with all transportation modes (m) of the multimodal transportation network; (b) for at least one transfer of the set of feasible transfers from a station ($p_t^i$) on the origin trip (t) to a reachable station ($p_u^j$) on a target trip (u), computing, at each station ($p_u^{k>j}$) of the target trip (u) after the reachable station ($p_u^j$), a value of the earliest arrival/change time specifically associated with the transportation mode ($m_u$) of the multimodal transportation network used by the target trip (u); (c) removing the transfer only if determining that each computed value of the earliest arrival/change time is not improved by the transfer; (d) outputting the set of feasible transfers for computing at least one itinerary in the multimodal transportation network; and (e) performing a routing
(Continued)

optimization algorithm so as to build, among the itineraries having a main part from an initial trip belonging to the set of possible initial trips to a final trip belonging to the set of possible final trips, at least one optimal itinerary according to the earliest arrival time and the number of transfers or the latest departure time and the number of transfers, when considering only trips from the set of possible trips using the selected transportation modes, and only transfers from the subset of feasible transfers between considered trips.

42 Claims, 6 Drawing Sheets (52) U.S. Cl.
CPC ....... *G01C 21/3453* (2013.01); *G06Q 10/047* (2013.01); *G06Q 50/14* (2013.01)

(58) Field of Classification Search
CPC ............ G01C 21/3438; G01C 21/3484; G01C 21/3676; G01C 21/20; G01C 21/3679; G01C 21/34; G01C 21/3635; G01C 21/3461; G01C 21/3492; G01C 21/3667; G01C 21/3415; G06Q 10/047; G06Q 50/14; G06Q 10/025; G06Q 10/00; G06Q 10/083; G06Q 10/08355; G06Q 50/30; G06Q 30/0283; G06Q 10/06311; G06N 3/126; G06N 3/045; G06N 3/08; G05D 1/0221; G05D 1/0212; G06F 16/29; G06F 16/9535; G06F 2111/06; G06F 30/20; G06F 30/27; G06F 16/27; G06F 16/9537; H04W 4/025; H04W 4/021; H04W 4/029; G08G 1/096833; G08G 1/096838; G08G 1/20; G08G 5/0095

See application file for complete search history.

(56) References Cited

U.S. PATENT DOCUMENTS

| | | | |
|---|---|---|---|
| 6,785,608 B1 | 8/2004 | Milici et al. | |
| 8,005,610 B2 | 8/2011 | Bast et al. | |
| 8,335,643 B2 | 12/2012 | Vandivier et al. | |
| 8,417,409 B2* | 4/2013 | Bast | G01C 21/3423 |
| | | | 701/25 |
| 8,494,771 B2* | 7/2013 | Delling | G06Q 50/14 |
| | | | 701/533 |
| 8,504,034 B2 | 8/2013 | Miyake et al. | |
| 8,786,605 B1 | 7/2014 | Curtis et al. | |
| 9,082,134 B2 | 7/2015 | Gishen | |
| 10,036,647 B2* | 7/2018 | Barraci | G01S 19/396 |
| 10,436,597 B1* | 10/2019 | Faaborg | G01S 19/13 |
| 2002/0059025 A1 | 5/2002 | Kim et al. | |
| 2003/0109266 A1 | 6/2003 | Rafiah et al. | |
| 2004/0218536 A1 | 11/2004 | Yasukawa et al. | |
| 2005/0043884 A1 | 2/2005 | Atarashi | |
| 2007/0008949 A1 | 1/2007 | Balandin | |
| 2008/0075007 A1 | 3/2008 | Mehta et al. | |
| 2010/0036606 A1 | 2/2010 | Jones | |
| 2010/0082245 A1 | 4/2010 | Patenaude et al. | |
| 2010/0153004 A1* | 6/2010 | Natsume | G08G 1/096883 |
| | | | 701/533 |
| 2010/0228574 A1 | 9/2010 | Mundinger et al. | |
| 2010/0280748 A1 | 11/2010 | Mundinger et al. | |
| 2010/0280853 A1 | 11/2010 | Petralia et al. | |
| 2010/0305984 A1 | 12/2010 | Ben-Yitschak et al. | |
| 2011/0112759 A1 | 5/2011 | Bast et al. | |
| 2011/0125666 A1 | 5/2011 | Laurent et al. | |
| 2011/0302214 A1 | 12/2011 | Frye et al. | |
| 2012/0008536 A1 | 1/2012 | Borghei | |
| 2012/0253657 A1 | 10/2012 | Francis | |
| 2013/0060468 A1* | 3/2013 | Delling | G01C 21/3423 |
| | | | 701/527 |
| 2013/0245940 A1 | 9/2013 | Shinagawa et al. | |
| 2013/0261967 A1 | 10/2013 | Shinagawa et al. | |
| 2013/0262222 A1 | 10/2013 | Gibson et al. | |
| 2013/0304378 A1* | 11/2013 | Graells | H04W 4/42 |
| | | | 701/533 |
| 2014/0200807 A1 | 7/2014 | Geisberger | |
| 2014/0257697 A1 | 9/2014 | Gishen | |
| 2014/0278086 A1 | 9/2014 | San Filippo et al. | |
| 2014/0343974 A1* | 11/2014 | Graells | G06Q 10/02 |
| | | | 705/5 |
| 2015/0095355 A1 | 4/2015 | Patton | |
| 2015/0356759 A1 | 12/2015 | Delling et al. | |
| 2015/0371157 A1 | 12/2015 | Jaffe | |
| 2016/0033283 A1* | 2/2016 | Ulloa Paredes | G06Q 50/40 |
| | | | 701/465 |
| 2016/0203422 A1* | 7/2016 | Demarchi | G06F 16/29 |
| | | | 705/6 |
| 2017/0074669 A1* | 3/2017 | Newlin | G01C 21/3423 |
| 2017/0123421 A1 | 5/2017 | Kentley et al. | |
| 2018/0038706 A1 | 2/2018 | Ellenby et al. | |
| 2018/0102985 A1 | 4/2018 | Byers et al. | |
| 2019/0057340 A1 | 2/2019 | Wang | |
| 2019/0130350 A1 | 5/2019 | Nguyen et al. | |
| 2019/0383621 A1 | 12/2019 | Isaacs et al. | |
| 2019/0383622 A1 | 12/2019 | Aich et al. | |
| 2019/0383623 A1* | 12/2019 | Aich | G06Q 10/047 |
| 2019/0392368 A1 | 12/2019 | Raghunathan et al. | |
| 2020/0134747 A1 | 4/2020 | Zhang | |
| 2020/0173808 A1* | 6/2020 | Beaurepaire | G06Q 50/40 |
| 2020/0182637 A1 | 6/2020 | Kumar et al. | |
| 2020/0272954 A1 | 8/2020 | Serra et al. | |
| 2020/0273333 A1* | 8/2020 | Elshenawy | G08G 1/096805 |
| 2020/0378773 A1 | 12/2020 | Lehoux-Lebacque et al. | |
| 2021/0182751 A1* | 6/2021 | Pan | H04L 67/52 |
| 2021/0248633 A1* | 8/2021 | Simpson | G06Q 50/01 |
| 2022/0018667 A1* | 1/2022 | Al-Dujaili | G06Q 50/40 |
| 2022/0065651 A1 | 3/2022 | Beaurepaire et al. | |
| 2022/0095079 A1 | 3/2022 | Volkerink et al. | |

FOREIGN PATENT DOCUMENTS

| | | | | | |
|---|---|---|---|---|---|
| IN | 4559/CHE/2012 A | * | 4/2014 | ............ | G06F 17/00 |
| JP | 2007520685 | | 7/2007 | | |
| JP | 2013511095 | | 3/2013 | | |
| JP | 2014032139 A | | 2/2014 | | |
| JP | 2016045020 | | 4/2016 | | |
| JP | 2017075967 A | | 4/2017 | | |
| JP | 2018109621 A | | 7/2018 | | |
| KR | 20180081022 A | * | 7/2018 | ............ | G06Q 50/40 |
| WO | 2005013234 A1 | | 2/2005 | | |
| WO | WO2008142783 A1 | | 11/2008 | | |
| WO | WO201718583 | | 11/2017 | | |

OTHER PUBLICATIONS

Trip-based_public_transit.pdf (Year: 2015).*
Translation of In 4559/CHE/2012 A retrieved from IP.com on Mar. 30, 2023 (Year: 2023).*
Translation of KR-20180081022-A retrieved from Espacenet on Mar. 8, 2024 (Year: 2024).*
EngineeringAlgorithmsforRoutePlanninginMultimodalTransportationNetworks (Year: 2016).*
European Search Report for EP 19305687.6 (Jul. 25, 2019) Jul. 25, 2019.
European Search Report for EP 19305689.2 (Jul. 26, 2019) Jul. 26, 2019.
U.S. Appl. No. 17/335,402, filed Jun. 1, 2021, entitled, "Method for Computing a Personalized Itinerary From a Departure Location to an Arrival Location" 2021.
Office Action from Japanese Patent Office for Japanese Patent Application No. 2020-093731 (Japanese copunter part to U.S. Appl. No. 16/830,621) May 11, 2021 May 11, 2021.
English Translation of Abstract of Published Japanese Patent Application No. JP 2007-520685 (A) Jul. 26, 2007 2007.

(56) References Cited

OTHER PUBLICATIONS

English Translation of Abstract of Published Japanese Patent Application No. JP 2016-045020 (A) Apr. 4, 2016 2016.

English Translation of Abstract of Published Japanese Patent Application No. JP 2013-511095 (A) Feb. 28, 2013 2013.

Liu, Lu, and Liqiu Meng. 'Algorithms of Multi-Modal Route Planning Based on the Concept of Switch Point'. Photogrammetrie—Fernerkundung—Geoinformation 2009, No. 5 (Nov. 1, 2009): 431-44. https://doi.org/10.1127/1432-8364/2009/0031. 2009.

Hannah Bast, Mirko Brodesser, and Sabine Storandt. Result Diversity for Multi-Modal Route Plan-ning. In Daniele Frigioni and Sebastian Stiller, editors, 13th Workshop on Algorithmic Approaches for Transportation Modelling, Optimization, and Systems, vol. 33 of OpenAccess Series in Infor¬matics (OASIcs), pp. 123-136, Dagstuhl, Germany, 2013. Schloss Dagstuhl-Leibniz-Zentrum fuer Informatik 2013.

Julian Dibbelt, Thomas Pajor, and Renato F. Werneck. Public transit labeling. In Bampis E., editor, Experimental Algorithms SEA 2015, vol. 9125 of Lecture Notes in Computer Science. Springer, 2015 2015.

Moritz Baum, Valentin Buchhold, Jonas Sauer, Dorothea Wagner, and Tobias Zündorf. Unlimited transfers for multi-modal route planning: An efficient solution. In Proceedings of ESA 2019, to appear, 2019 2019.

Vassilissa Lehoux and Darko Drakulic. Mode Personalization in Trip-Based Transit Routing. In Gianlorenzo D'Angelo and Twan Dollevoet, editors, 19th Workshop on Algorithmic Approaches for Transportation Modelling, Optimization, and Systems (ATMOS 2019), vol. 75 of OpenAccess Series in Informatics (OASIcs), Dagstuhl, Germany, 2019. Schloss Dagstuhl-Leibniz-Zentrum fuer Informatik 2019.

Ile De France Mobilités. Open data. https://www.iledefrance-mobilites.fr 2018.

Duc-Minh Phan and Laurent Viennot. Fast public transitrouting with unrestrict-edwalking through hub labeling. In Proceedings of the Special Event on Analysis of Experimental Algorithms (SEA2), Lecture Notes in Computer Science. Springer, 2019. 2019.

Dorothea Wagner and Tobias Zundorf. Public Transit Routing with Unrestricted Walking. In Gianlorenzo D'Angelo and Twan Dollevoet, editors, 17th Workshop on Algorithmic Approaches for Transportation Modelling, Optimization, and Systems (ATMOS 2017), vol. 59 of OpenAccess Series in Informatics (OASIcs), pp. 7:1-7:14, Dagstuhl, Germany, 2017. Schloss Dagstuhl-Leibniz-Zentrum fuer Informatik. 2017.

U.S. Appl. No. 16/830,621, filed Mar. 26, 2020, entitled, "Method for Preprocessing a Set of Non-Scheduled Lines Within a Multimodal Transportation Network of Predetermined Stations and for Computing at Least One Itinerary From a Departure Location to an Arrival Location" 2020.

U.S. Appl. No. 16/700,096, filed Dec. 2, 2019, entitled, "Method for Computing at Least One Itinerary From a Departure Location to an Arrival Location" 2019.

U.S. Appl. No. 16/853,914, filed Apr. 21, 2020, entitled, "Method for Computing an Itinerary From a Departure Location to an Arrival Location" 2020.

Ile De France Mobilités. Open data. https://www.iledefrance-mobilites.fr 2019.

U.S. Appl. No. 16/995,969, filed Aug. 18, 2020, entitled, "Method for Computing an Itinerary From a Departure Location to an Arrival Location" 2020.

Barrett, Chris, Riko Jacob, and Madhav Marathe. 'Formal-Language-Constrained Path Problems'. SIAM Journal on Computing 30 (2000): 200-0. 2000.

Bast, Hannah, Erik Carlsson, Arno Eigenwillig, Robert Geisberger, Chris Harrelson, Veselin Raychev, and Fabien Viger. 'Fast Routing in Very Large Public Transportation Networks Using Transfer Patterns'. In in Proceedings of the 18th Annual European Conference on Algorithms: Part I, ESA'10, 290-301. Springer-Verlag, 2010. 2010.

Bast, Hannah, Daniel Delling, Andrew V. Goldberg, Matthias Müller-hannemann, Thomas Pajor, Peter Sanders, Dorothea Wagner, and Renato F. Werneck. 'Route Planning in Transportation Networks', 2014. 2014.

E. Cohen, E. Halperin, H. Kaplan, and U. Zwick. Reachability and distance queries via 2-hop labels. SIAM Journal on Computing, 32(5):13381355, 2003 2003.

Dibbelt, Julian, Thomas Pajor, Ben Strasser, and Dorothea Wagner. 'Intriguingly Simple and Fast Transit Routing'. In in SEA, vol. 7933 of LNCS, 43-54. Springer, 2013. 2013.

Daniel Delling, Thomas Pajor, and Renato F. Werneck. Round-based public transit routing. In Proceedings of the Fourteenth Workshop on Algorithm Engineering and Experiments (ALENEX), 2013. 2013.

Julian Dibbelt, Thomas Pajor, and Dorothea Wagner. User-constrained multi-modal route plan¬ning. In SIAM, editor, Proceedings of the 14th Meeting on Algorithm Engineering and Experiments (ALENEX12), p. 118129, 2012 2012.

Geisberger, Robert, Peter Sanders, Dominik Schultes, and Daniel Delling. 'Contraction Hierarchies: Faster and Simpler Hierarchical Routing in Road Networks'. In Experimental Algorithms, edited by Catherine C. McGeoch, 5038:319-33. Berlin, Heidelberg: Springer Berlin Heidelberg, 2008. https://doi.org/10.1007/978-3-540-68552-4_24. 2008.

Goldberg, Andrew V., and Chris Harrelson. 'Computing the Shortest Path: A Search Meets Graph Theory'. In Proceedings of the Sixteenth Annual ACM-SIAM Symposium on Discrete Algorithms, 156-165. SODA '05. Vancouver, British Columbia: Society for Industrial and Applied Mathematics, 2005 2005.

Matthias Hertel Hannah Bast and Sabine Storandt. Scalable transfer patterns. In Proceedings of the Eighteenth Workshop on Algorithm Engineering and Experiments (ALENEX), 2016 2016.

Kirchler, Dominik. 'Efficient Routing on Multi-Modal Transportation Networks'. Phdthesis, Ecole Polytechnique X, 2013. https://pastel.archives-ouvertes.fr/pastel-00877450. 2013.

Witt, Sascha. 'Trip-Based Public Transit Routing'. ArXiv:1504.07149 [Cs] 9294 (2015): 1025-36. https://doi.org/10.1007/978-3-662-48350-3_85. 2015.

Witt, Sacha. Trip-based public transit routing using condensed search trees. In Marc Goerigk and Renato Werneck, editors, 16th Workshop on Algorithmic Approaches for Transporation Modelling, Optimization, and Systems (ATMOS16), No. 10, 2016. 2016.

Liu, Xudong, Christian Fritz, and Matthew Klenk. 'On Extensibility and Personalizability of Multi-Modal Trip Planning', n.d., 7. 2018.

Ulloa Luis, Lehoux Vassilissa, Roulland Fréderic. Trip planning within a multimodal urban mobility, IET Intelligent Transport Systems, 12(2):87-92, 2018. 2018.

Bast, Hannah, Daniel Delling, Andrew Goldberg, Matthias Müller-Hannemann, Thomas Pajor, Peter Sanders, Dorothea Wagner, and Renato F. Werneck. 'Route Planning in Transportation Networks'. ArXiv:1504.05140 [Cs], Apr. 20, 2015. http://arxiv.org/abs/1504.05140. 2015.

Web page: https://data.grandlyon.com/ Home • Metropolitan Data of the Grand Lyon.Pdf, n.d. 2018.

Web page : https://opendata.stif.info. 'Home page—Portail Open Data Île-de-France Mobilités—Open Data Île-de-France Mobilités. Pdf', n.d. 2018.

"General transit feed standard format reference documentation," https://developers.google.com/transit/gtfs/reference/2018.

Artigues, Christian, Marie-josé Huguet, Fallou Gueye, Frédéric Schettini, and Laurent Dezou. State-Based Accelerations and Bidirectional Search for Bi-Objective Multi-Modal Shortest Paths, 2013. 2013.

Bast, Hannah, Mirko Brodesser, and Sabine Stor. 'Result Diversity for Multi-Modal Route Planning'. In 13th Workshop on Algorithmic Approaches for Transportation Modelling, Optimization, and Systems, vol. 33 of OpenAccess Series in Informatics (OASIcs), pp. 123-136, Dagstuhl, 2013. 2013.

Delling, Daniel, Julian Dibbelt, Thomas Pajor, Dorothea Wagner, and Renato F. Werneck. Computing Multimodal Journeys in Practice?, n.d. 2018.

Garey M. R. and D. S. Johnson. Computers and intractability: A guide to the theory of NP-completeness. Freeman, 1979. 1979.

(56) References Cited

OTHER PUBLICATIONS

Hansen, Pierre. 'Bicriterion Path Problems'. In Multiple Criteria Decision Making Theory and Application, edited by Günter Fandel and Tomas Gal, 177:109-27. Berlin, Heidelberg: Springer Berlin Heidelberg, 1980. https://doi.org/10.1007/978-3-642-48782-8_9. 1980.

Idri, Abdelfattah, Mariyem Oukarfi, Azedine Boulmakoul, Karine Zeitouni, and Ali Masri. 'A Distributed Approach for Shortest Path Algorithm in Dynamic Multimodal Transportation Networks'. Transportation Research Procedia 27 (2017): 294-300. https://doi.org/10.1016/j.trpro.2017.12.094. 2017.

Office Action from Japanese Patent Office for Japanese Patent Application No. 2020-093731 (Japanese copunter part to U.S. Appl. No. 16/830,621) Mar. 23, 2021 2021.

English Translation of Abstract of Published Japanese Patent Application No. JP 2014-032139 (A) 2014.

English Translation of Abstract of Published Japanese Patent Application No. JP 2017-075967 (A) 2017.

English Translation of Abstract of Published Japanese Patent Application No. JP 2018-109621 (A) 2018.

Dorothea Wagner et al: "Geometric containers for efficient shortest-path computation", ACM Journal of Experimental Algorithmics, Association of Computing Machinery, New York, NY, US, vol. 10, Dec. 31, 2005 (Dec. 31, 2005), pp. 1.3-es, XP058137002, ISSN: 1084-6654, DOI: 10.1145/1064546.1103378 2005.

Office Action dated Nov. 16, 2022 of the European Patent Office for corresponding European Patent Application 19305687.6 filed May 29, 2019 Nov. 16, 2022.

European Search Report for EP 19305064.8 (Apr. 18, 2019).

Witt, Sasha "Trip Based Public Transit Routing," N. Bansal and I. Finocchi (Eds.): ESA 2015, LNCS 9294, pp. 1025-1036, 2015 2015.

Daniel Delling et al., "Computing Multimodal Journeys in Practice," V. Bonifaci et al. (Eds.): SEA 2013, LNCS 7933, pp. 260-271, 2013 2013.

\* cited by examiner

Input: Timetable data, footpath data, transfer set $T$
Output: Reduced transfer set $T$
for trip $t$ do
    $\tau_A(\cdot, \cdot) \leftarrow \infty$           ▷ Earliest arrival time at stops for a given mode subset
    $\tau_C(\cdot, \cdot) \leftarrow \infty$           ▷ Earliest change time at stops for a given mode subset
    for $i \leftarrow |\vec{p}(t)| - 1, \ldots, 1$ do
        UPDATE($p_t^i, m_t, m_t, \tau_{arr}(t,i), \tau_{arr}(t,i) + \tau_{fp}(p_t^i, p_t^i)$)
        for each stop $q \neq p_t^i$ such that $\Delta\tau_{fp}(p_t^i, q)$ is defined do
            UPDATE($q, m_t, m_t, \tau_{arr}(t,i) + \tau_{fp}(p_t^i, q), \tau_{arr}(t,i) + \tau_{fp}(p_t^i, q)$)
        for each transfer $p_t^i \rightarrow p_u^j \in T$ do
            $keep \leftarrow$ false
            for each stop $p_u^k$ on trip $u$ with $k > j$ do
                $keep \leftarrow keep \vee \tau_{arr}(u,k) < \tau_A(p_u^k, m_u)$
                $keep \leftarrow keep \vee \tau_{arr}(u,k) + \tau_{fp}(p_u^k, p_u^k) < \tau_C(p_u^k, m_u)$
                UPDATE($q, m_t, m_u, \tau_{arr}(u,k), \tau_{arr}(u,k) + \tau_{fp}(p_u^k, p_u^k)$)
                for each stop $q \neq p_u^k$ such that $\Delta\tau_{fp}(p_u^k, q)$ is defined do
                    $\rho \leftarrow \tau_{arr}(u,k) + \Delta\tau_{fp}(p_u^k, q)$
                    $keep \leftarrow keep \vee (\rho < \tau_A(q, m_u)) \vee (\rho < \tau_C(q, m_u))$
                    UPDATE($q, m_t, m_u, \rho, \rho$)
            if $\neg keep$ then
                $T \leftarrow T \setminus \{p_t^i \rightarrow p_u^j\}$         ▷ No improvement: remove the transfer procedure UPDATE($q, m_t, m_u, e, c$)
    Input: stop $q$, mode $m_t$, mode $m_u$, arrival time $e$, change time $c$
    $\tau_A(q, m_u) \leftarrow \min(\tau_A(q, m_u), e)$
    $\tau_C(q, m_u) \leftarrow \min(\tau_C(q, m_u), c)$
    if $m_t = m_u$ then         ▷ Mode $m_t$ is allowed since we are transferring from it
        for each $m \in M \setminus \{m_t\}$ do
            $\tau_A(q, m) \leftarrow \min(\tau_A(q, m_t), \tau_A(q, m))$
            $\tau_C(q, m) \leftarrow \min(\tau_C(q, m_t), \tau_C(q, m))$

METHOD FOR PREPROCESSING A SET OF FEASIBLE TRANSFERS FOR COMPUTING ITINERARIES IN A MULTIMODAL TRANSPORTATION NETWORK

PRIORITY INFORMATION

Pursuant to 35 U.S.C.§ 119 (a), this application claims the benefit of earlier filing date and right of priority to European Patent Application Number EP 19305687.6, filed on May 29, 2019, the contents of which are hereby incorporated by reference in their entirety.

BACKGROUND

A journey planner (also called trip planner) is a solver used to determine an optimal itinerary from a departure location (the origin) to an arrival location (the destination), using one and/or more transport modes, in particular public transportation modes (e.g., subway, tram, bus, etc.). A journey planner is said to be "multimodal" when covering several transportation modes and allowing intermodal connections (i.e. transfers from a mode to another). Searches may be optimized on different criteria, for example fastest, shortest, least changes, and/or cheapest. They may be constrained, for example, to leave and/or arrive at a certain time, to avoid certain waypoints, etc.

Public transport modes generally operate according to published schedules; given that public transport services only depart at specific times (unlike private modes of transportation such as driving, walking, and/or cycling, which may leave at any time), a journey planner algorithm must therefore not only find a path to a destination, but seek to optimize it so as to minimize the arrival time in this time-dependent setting.

One of the most performant algorithms used to this end is the "Trip-Based Public Transit Routing" algorithm ("Trip-Based Public Transit Routing Algorithm" and/or "TB algorithm"), which is a method based on iterations, similar to breadth-first search in a graph, where one iteration corresponds to taking a trip. It is disclosed in the document Sacha Witt. *Trip-based public transit routing*. In N. Bansal and I. Finocchi, editors, ESA 2015, volume 9294 of Lecture Notes in Computer Science, Berlin, Heidelberg, 2015. Springer.

The TB algorithm is an algorithm for computing the Pareto front, along with one optimal path with this value for each value in the Pareto front for two criteria in multimodal networks restricted to transit and walking between stations, considering an origin, a destination, and a start time. The two criteria considered are: Min arrival time (i.e. the earliest arrival time considering the start time); and Min transfer number (i.e. the minimum number of connections, in other words the changes of public transport mode, either within the same network for instance from a subway line to another—and/or intermodally).

An earliest arrival time query consists in a breadth-first search like exploration in a time-independent graph where the trips are vertices and the feasible transfers the arcs (i.e. which explores all of the neighbor trips on the graph at the present depth prior to moving on to the trips at the next depth level). So, at each iteration, one additional trip is taken in each solution to try and get to a destination.

Note that an extension of the TB algorithm which consists in latest departure time queries may be considered. In latest departure time queries a desired arrival time is given instead of a start time, and the two criteria considered for computing the Pareto paths are: Max departure time (i.e. the latest departure time considering the end time); and Min transfer number.

A latest departure time query consists in a backward search like exploration in the above defined time-independent graph where the trips are vertices and the feasible transfers the arcs.

The TB algorithm is based on the preprocessing and pruning of the feasible transfers between trips. The aim is to build for each trip a neighborhood of reachable trips in such way that for any optimal value in the Pareto front, there is an optimal path with this value such that the set of preprocessed neighbors will contain the transition between one trip and its neighbor in this optimal path.

Indeed, although the resulting method would be correct, it is not advisable to use the complete set of feasible transfers between trips during the search phase, as it would be large and the useless arcs will impact the exploration time.

For example, when used in the Korean transportation network, pruning by the TB algorithm removes about eight feasible transfers out of nine, when considering only the earliest feasible transfers to each line.

In fact, if all the feasible transfers between one trip and a different line (totally ordered set of trips with the same stop sequence) are considered, only the earliest trip (minimum trip regarding the line order) will be relevant for the above defined Pareto queries.

Thus, it is desirable to prune the set of feasible transfers while keeping enough transfers to compute all the optimal values (i.e. the Pareto front) and at least one optimal path with this value for each element in the Pareto front. For this, two pruning methods are provided: (1) removing U-turn transfers for each trip: transfers that can only take someone back to the previous stop in the trip (at a later time than the arrival time at that previous stop taking the trip); and (2) removing transfers that cannot lead to improvement in arrival times: taking later transfers (or remaining on the current trip) leads to identical and/or better arrival times, and all trips reachable via the transfer can be reached via those later transfers.

Figure 2:
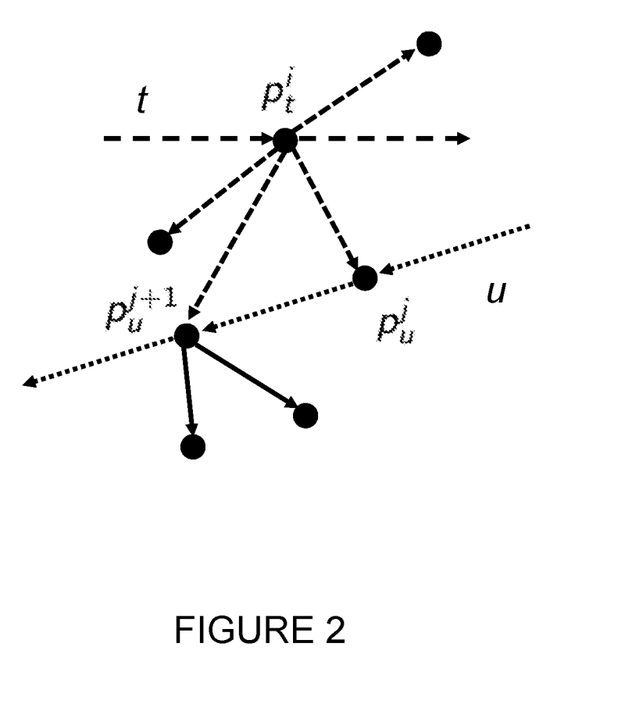
FIGS. 2 and 3 illustrate examples of configurations of trips and transfers.

For example, in the FIG. 2, from the stop $p_t^i$ of trip t, the transfer to stop $p_u^j$ of trip u will always lead to a better arrival times than transfer to the next stop $p_u^{j+1}$ of trip u, so that transfer $p_t^i \rightarrow p_u^{j+1}$ can be pruned.

Note that a set of transfers that is correct for earliest arrival time queries (i.e. containing enough transfers for computing the Pareto front and at least one optimal path with this value for each optimal value, whatever the instance) is also correct for latest departure time queries. It has been disclosed in Vassilissa Lehoux and Darko Drakulic, 2019. *Mode Personalization in Trip-Based Transit Routing*. 19th Symposium on Algorithmic Approaches for Transportation Modelling, Optimization, and Systems (ATMOS 2019). Open Access Series in Informatics (OASIcs), vol 75, pages 13:1-13:15.

A limitation of the current TB algorithm is that it is not possible to precisely specify at query time what combination of modes the user is willing to include and/or exclude. More precisely, a user might want to avoid using a bus, considering it not reliable enough, and/or in another context, one might want to avoid the tramway, considering it too crowded.

Indeed, the pruning may remove transfers that would actually become useful if restricted to a particular combination of modes, so that there are chances that the solution found when selecting modes is not the optimal one.

Figure 3:
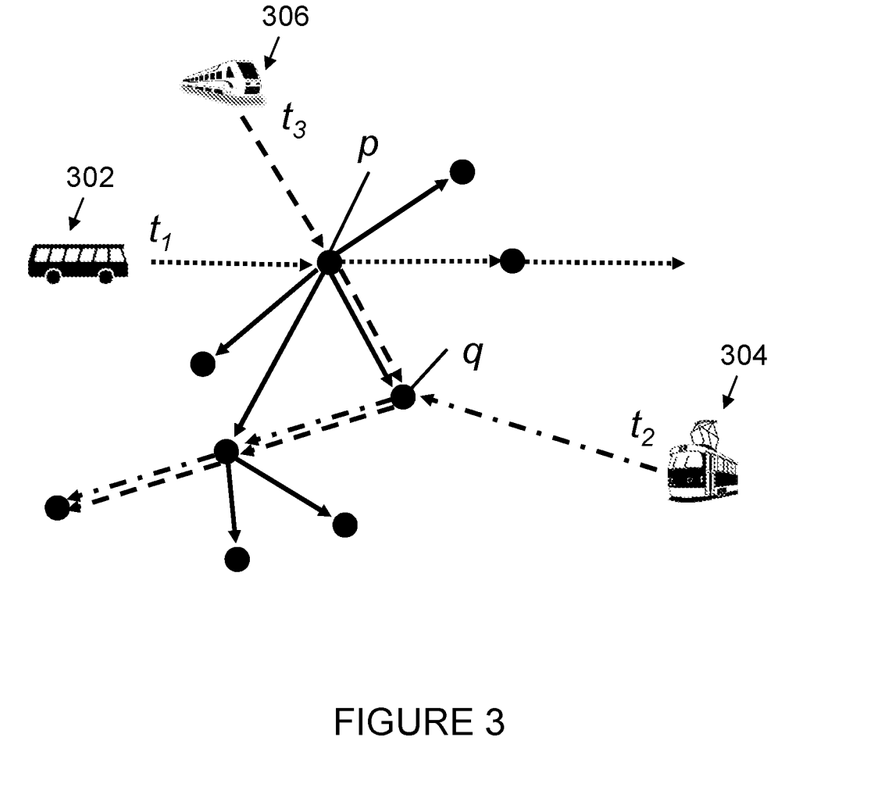

For example, in the FIG. 3, suppose the three trips $t_1$, $t_2$ and $t_3$ are of different modes, for example, bus 302, tram 304, and metro 306. When looking into the transfers from trip $t_1$, it is possible to transfer from $t_1$ to $t_3$ at station p and from $t_1$ to $t_2$ by walking between the stations p and q (walking paths are represented as solid lines in FIG. 3).

The pruning removes transfers from trip $t_1$ to trip $t_2$ since it cannot improve arrival times at any station, because transferring to trip $t_3$ is more efficient. But in a configuration where trip $t_3$ is excluded (the user does not want to use the metro), trip $t_2$ should be taken to reach additional stops.

In order to reliably manage mode selection with the TB algorithm, preprocessing should be performed for each possible combination of selected modes, which requires multiple iterations of preprocessing and multiple servers running to handle such queries, as the number of combinations exponentially increases with the number of modes.

Therefore, it is desirable to provide a method for computing itineraries in a multimodal transportation network that takes into consideration a user's desired modes of transport.

BRIEF DESCRIPTION OF THE DRAWINGS

The drawings are only for purposes of illustrating various embodiments and are not to be construed as limiting, wherein:

FIG. 6 illustrates a method for pruning the set of transfers in a multimodal transportation network with user desired modes of transport.

DETAILED DESCRIPTION OF THE DRAWING

Figure 4:
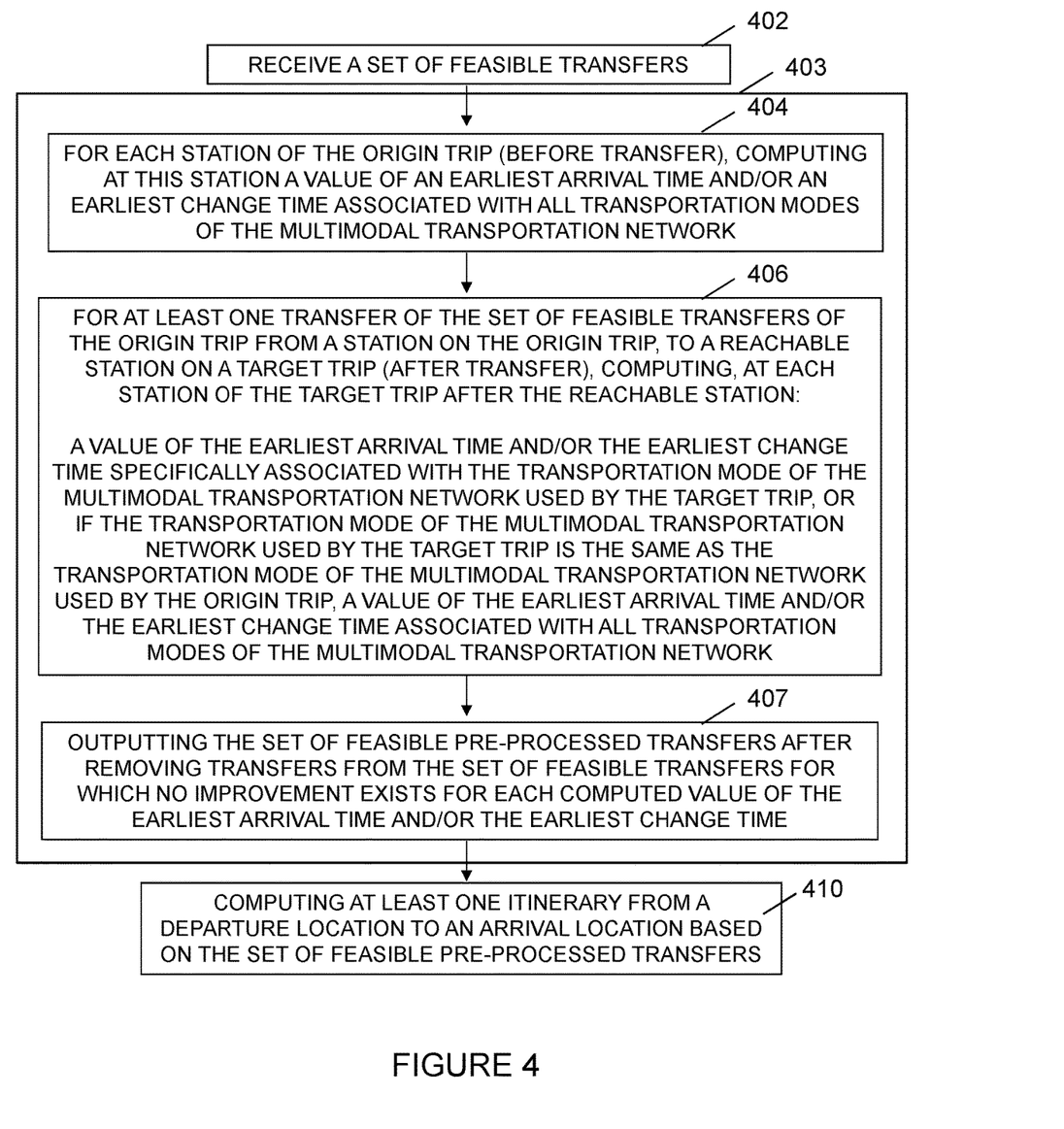
FIG. 4 illustrates a method for preprocessing a set of feasible transfers within a multimodal transportation network of predetermined stations.
Figure 5:
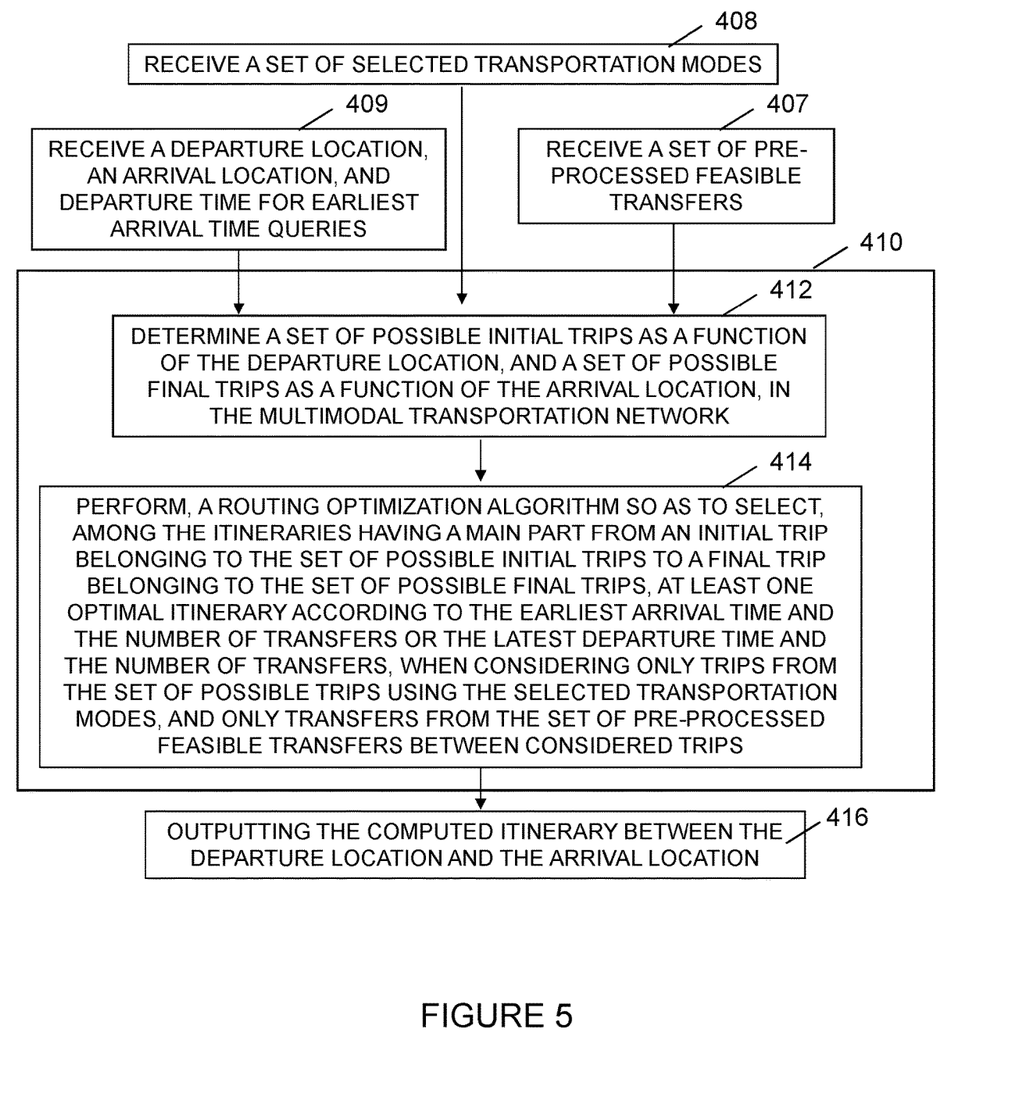
FIG. 5 illustrates a method for computing at least one itinerary from a departure location to an arrival location based on a preprocessed set of feasible transfers, processed as set out in FIG. 4.

As shown in FIG. 4, FIG. 5, and FIG. 6, a method 403 preprocesses a set of feasible transfers for each trip, within a multimodal transportation network of predetermined stations (i.e., feasible transfers), and a method 410 computes at least one itinerary from a departure location to an arrival location based on the preprocessed set of feasible transfers (the details of which are shown in FIG. 4). More specifically, the preprocessing reduces the set of all feasible transfers to a subset, and the itinerary can only use transfers of this subset of feasible transfers.

It is noted that the set of transfers is correct (i.e. for any input, and for any optimal value corresponding to this input, the set of transfers contains all transfers that are part of one optimal solution with this value).

The multimodal transportation network is preferably a network of public transportation modes, in particular "scheduled" transportation modes, i.e. following a line (a predetermined sequence of stations) and of which timetables are known. Examples of scheduled public transportation modes include bus, metro, tramway, train, water shuttle, carpooling, etc.

It is noted that in alternate embodiments, the multimodal transportation network might comprise a network of scheduled private transportation modes, which includes airplane, van shuttle, ship, ferry, etc., alone and/or in combination with a network of public transportation modes.

It is further noted that the multimodal transportation network might further comprise non-scheduled transportation modes such as on-demand bus, ride-hailing, or even bike sharing (wherein the users can simply take a bike for going from a station to another without any restriction) alone or in combination with public and private scheduled transportations modes, but for the purpose of the descriptions provided below only scheduled public transportation modes are involved in the multimodal transportation network. It is noted that a plurality of transportation modes is involved, i.e. at least two of them.

By "station", and/or "stop," it is meant a facility at a given location wherein at least one of the transportation modes of the multimodal transportation network regularly stops to load or unload passengers, for example a bus station, a metro station, a train station, a transportation hub (e.g., that includes a bus and train station) etc.

A "displacement" within the multimodal transport network is defined as a sequence of trips each from a station of the multimodal transportation network to another that may or may not involve changing transportation modes between stations.

By "trip," it is meant a displacement using a single one of the transportation modes, such as a bus trip, i.e. following a line. Generally, any displacement comprises, between two successive trips, a transfer (i.e., it can be seen as an alternation of trips and transfers).

By "transfer," it is meant a connection from a transportation mode to another, for example a displacement between the station at which a trip terminates and the station at which a new trip initiates. A transfer, noted as $p_t^i \to p_u^j$ (see below), is "feasible" for a trip t if it is possible to leave the trip t at station $p_t^i$ and to board a trip u at station $p_u^j$; i.e., the transfer duration is compatible with the schedules of trips t and u.

In description below, the trips t, u before and after a transfer will be respectively called "origin" trip and "target" trip, so as to distinguish them. In other words, the user transfers from an origin trip t to a target trip u. Note that a target trip may be the origin trip for a further transfer.

Such transfer is performed according to a "first transportation mode," which is none of the public transportation modes of the network, generally walking, but also possibly using portable or wearable assists, such as kick scooter and/or skate.

The first transportation mode is a non-scheduled and station-free mode, which is freely usable by the user without any limitation. Typically, the first transportation mode is universal and does not require any vehicle (or at worst a "light" and transportable one such as a skate). Note that a transfer does not necessarily involve a displacement (a station can be common to two trips, possibly of the same transportation mode, for example two subways lines).

For the purpose of the following description, the first transportation mode will be assumed to be walking, i.e., any displacement within the network is restricted to transit and walking between stations.

Considering a set T of all the feasible transfers, the aim of the preprocessing is, as previously explained, to prune this set T so as to output a subset T' in order to highly reduce the exploration time when computing an itinerary on this basis, while granting optimal results to queries. Note that the set of trips is not modified, so that the preprocessing corresponds to a simplification of the graph so as to remove arcs (transfers) between vertices (trips).

When an itinerary has to be computed within the network, the itinerary comprises successively: a beginning part from the departure location to an initial station of the multimodal transportation network of predetermined stations; a main part in the multimodal transportation network, (defined as an alternating of trips using a transportation mode of the multimodal transportation network, and of transfers using the first mode of transportation); and an end part from a final station of the multimodal transportation network to the arrival location.

The departure and arrival locations are geographical locations, typically locations on a map as defined by an address, a point of interest, coordinates, etc.

The beginning part and end part of the itinerary allow to "connect" the user to stations of the network. They could be "null" in particular if the departure/arrival location is an isolated station: then this station could be used as the initial/final station. Nevertheless, even in such case the user has the possibility to walk to another station.

The main part starts with an initial trip from an initial station which is the entry point of the multimodal transportation network for the present itinerary (the wording "source stop" can be found), and ends with a final trip on a target line up to a station which is the exit point of the multimodal transportation network (the wording "target stop" can be found).

The itineraries are preferably the optimal ones (or at least close to the optimal ones; i.e., approximations of the optimal ones) according to at least one criterion such as the arrival time (which should be the earlier), the duration of the itinerary (which should be the lowest), the departure time (which should be the latest), the length of the itinerary (which should be the shortest), the number of transfers (which should be the lowest), the price (which should be the lowest), etc.

In the example of the Trip-Based Public Transit Routing Algorithm that is detailed in the following description, two criteria are co-considered: arrival time and transfer number.

The beginning part and end part are performed according to the first transportation mode (i.e. walking) or possibly alternatively according to a second transportation mode, which could be any non-scheduled and station-free mode with a longer range than the first transportation mode (and still not one of the modes of the multimodal transportation network).

The second transportation mode is typically taxi, but could be any equivalent transportation mode, in particular any private vehicle ride, such as a car ride (typically lift by a friend, park-and-ride, ride-hailing, etc.), a motorcycle ride, and/or even a helicopter ride.

An example of a second transportation mode is disclosed in U.S. patent application Ser. No. 16/700,096, filed on Dec. 2, 2019 and entitled "METHOD FOR COMPUTING AT LEAST ONE ITINERARY FROM A DEPARTURE LOCATION TO AN ARRIVAL." The entire content of U.S. patent application Ser. No. 16/700,096 is hereby incorporated by reference.

It is to be understood that both the first and/or second transportation modes are only restricted by the cartography; i.e., the existence of ways (in particular roads), accesses, etc. and are considered to be able to reach any location, by contrast with the modes of the multimodal transportation network which rely on a predetermined list of stations.

To sum up, any considered itinerary starts with a beginning part bringing the user from the departure location to an initial station, then the user travels in a main part into the network using various public transportation modes (the multimodal transportation network) and walking (the first transportation mode) for transfers, up to a final station, for finishing the itinerary with the end part bringing the user from the final station to the arrival location.

Figure 1:
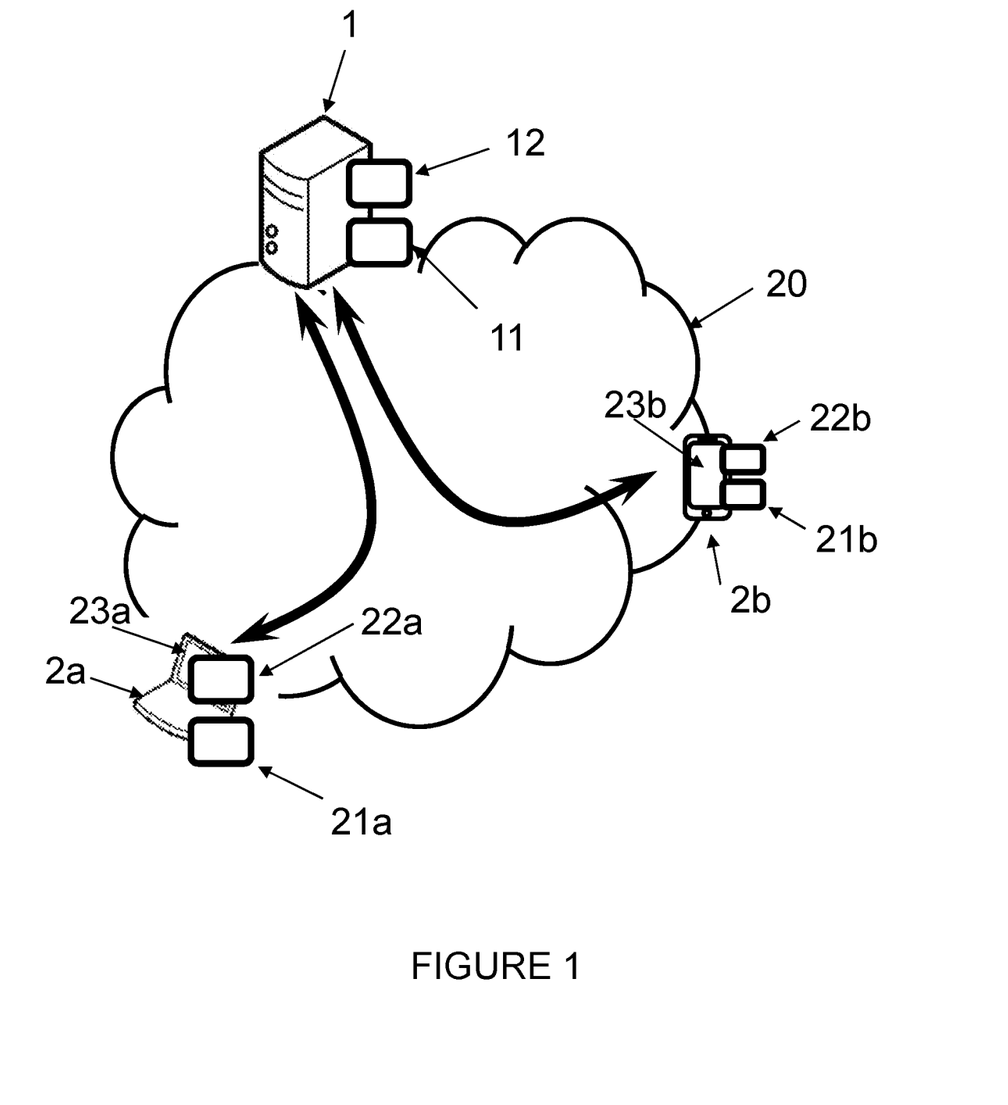
FIG. 1 illustrates an example of architecture in which the methods, described below, are performed.

The above-mentioned methods are implemented within an architecture such as illustrated in FIG. 1, by means of a server 1, a mobile computer 2a, or mobile phone 2b.

Each of these devices is typically connected to an extended network 20 such as the Internet for data exchange. Each device comprises data processing means (11, 21a, and 21b) such as a processor, and storage means (12, 22a, and 22b) such as a computer memory; e.g., a hard disk.

More specifically, the server 1 performs the preprocessing of the set of transfers, and the user generally owns a mobile phone 2b such as a smartphone, for inputting a request for itineraries (are inputted the departure location, the arrival location, and a departure time). The request for itineraries may be either directly processed by the mobile phone 2b, or transmitted to the server 1 for processing there. The present methods will not be limited to any specific implementation.

As previously explained, the pruning may remove transfers that would actually become useful if restricted to a particular combination of modes. Consequently, the present preprocessing method performs pruning steps so that a transfer is not pruned just because it is outperformed by another transfer if the modes involved are different.

The station sequence of a trip t is noted as $\vec{p}(t)=(p_t^1, p_t^2, \ldots)$, so that a transfer from a station $p_t^i$ (the $i^{th}$ station) on an origin trip t to a reachable station $p_u^j$ (the $j^{th}$ station) on a target trip u can be noted $p_t^i \to p_u^j \in T$. As explained, a transfer $p_t^i \to p_u^j$ is feasible if it is possible to leave trip t at station $p_t^i$ and to board trip u at station $p_u^j$. If $p_t^i \to p_j^j$ is feasible, then transfer from t to any later trip of the same line is also possible.

FIG. 4 sets forth generally a method 403 for preprocessing of a set of feasible transfers received at step 402 that comprises: for each origin trip t in the multimodal transportation network between two stations of the multimodal transportation network, initially, at step 404, an "initialization," for each station $p_t^i$ of the origin trip t, at this station $p_t^i$ a value of an earliest arrival time $\tau_A$ and/or an earliest change time $\tau_C$ associated with all transportation modes of the multimodal transportation network; then at step 406, computing, for at least one transfer of the set of feasible transfers (and possibly each feasible transfer) to a reachable station $p_u^j$ on a target trip u, at each station on the target trip after the reachable station (i.e. the stations $p_u^k$ on trip u with k>j) the earliest arrival time $\tau_A$ and/or the earliest change time $\tau_C$ (the change time $\tau_C$ at a station p generally corresponds to the earliest arrival time $\tau_A$ at this station plus a minimum change time $\Delta\tau_{ch}(p)$ between two trips at this station p), preferably both.

In the preprocessing, for each origin trip only the earliest feasible transfer to a target trip of each line at a given station of that target line is considered, as taking a later transfer cannot improve the arrival time and/or the number of transfers in a solution. Then, at step 407, the set of all feasible transfers is reduced (before being output for further processing) by keeping a transfer in the search graph only if making this transfer can improve the arrival time at any stop of the network, compared to the previously added transfers of the current origin trip.

The present preprocessing method 403 proposes to have the earliest arrival time $\tau_A$ and/or the earliest change time $\tau_C$ now depending on a transportation mode. In other words, there could be as many values of the earliest arrival/change time at a station as there are possible transportation modes, each value being specifically associated to a transportation mode.

Preferably, each value of the earliest arrival/change time associated to a given transportation mode of the multimodal transportation network corresponds to the earliest arrival/change time when using only the transportation mode and/or the transportation mode of the origin trip t. Indeed, both transportation modes of trips t and u have to be allowed for this transfer to happen. This method contrasts with other methods where the earliest arrival/change time was defined independent of the transportation modes used.

For instance, if M is the set of possible transportation modes (and $m_t$ the transportation mode associated with a trip t), are computed $\forall m \in M$ the earliest arrival/change time $\tau_A(p, m)$ and $\tau_C(p, m)$ at station p using only the mode m and/or the mode $m_t$ of the origin trip t. Practically, when considering a target trip u, the values of the earliest arrival/change time which are computed are the ones associated with the transportation mode used by the target trip u.

Thus, at step 407, a transfer can be discarded only when it provides no improvement on any of the values of the earliest arrival/change times computed for the origin trip t, i.e. the transfer is removed from the set of feasible transfers only if determining that for each transportation mode the arrival time and/or the change time associated with this transportation mode was never improved by the transfer (or if there is no improvement for any modes in the case where the transportation modes of the origin and destination trips are identical). In other words, if there is a station of the target trip u (or a neighboring station of such a station of the target trip u, see below) at which the earliest arrival/change time has been improved, then the transfer is kept.

By doing this, a transfer that would improve the earliest arrival time and/or the earliest change time for a mode but not for another mode would not be pruned.

Checking the value of arrival time and change time at stations for each mode enables to guaranty that all transfers that can belong to an optimal solution have been kept by the preprocessing.

Note that only the pruning part of the preprocessing that is based on arrival/change time at stations improvement is modified, so that the principle of known preprocessing can be kept as such.

In practice, the algorithm 502 shown in FIG. 6 may be used for pruning a given set of feasible transfers T and a set of possible transportation modes M.

In the algorithm 502, the idea of the pruning is advantageously, for each origin trip t, to start the pruning from the last station of the schedule (the value of i iteratively decreases from $|\vec{p}(t)|-1$, to initialize the earliest arrival/change time from the schedule's arrival time (the arrival time at the $i^{th}$ station $p_t^i$ of origin trip t, as defined by the schedule, is noted $\tau_{arr}(t,i)$), and to reach all possible neighboring stations q from that station by transfer.

By "neighboring," it is meant itself reachable from the station $p_t^i$ by a further feasible transfer, i.e. reachable using the first transportation mode (e.g., by pedestrian footpath). $\Delta\tau_{fp}(p, q)$ is used to represent the transfer duration (as a function of the first transportation mode, typically a walking duration) between station p and station q. Consequently, it initializes the earliest arrival and change times for those stations.

Then, each target trip u such that transfer $p_t^i \to p_u^j$ is feasible (and preferably u is the earliest trip v of its line such that $p_t^i \to p_v^j$ is feasible) is scanned in turn to reach more stations $p_u^k$ of the target trip u and their neighboring stations q, (again, the neighboring stations q are stations reachable by a further feasible transfer from a station $p_u^k$ of the target trip u) and/or update the earliest arrival/change times of already reached stations. It can be seen that, if the transportation mode has changed, for a reachable station $p_u^k$ and/or q, only the values $\tau_{A/C}(p_u^k, m_u)$, $\tau_{A/C}(q, m_u)$ associated with the transportation mode of the target trip u are updated. By updated, it is meant replacing the current value of the earliest arrival and/or change time for a given transportation mode by the computed value when using the transfer leads to an improvement compare to origin trip t and previously kept transfers. A comparison could be done to know whether an improvement (and thus an update) occurs. A Boolean keep is used to monitor whether at least one improvement has occurred.

Note that, in the case wherein $m_t = m_u$, i.e. the transfer $p_t^i \to p_u^j$ has not changed the transportation mode (i.e. trips t and u use the same mode), $\tau_{A/C}(p_u^k, m)$ can be updated also for each $m \in M \setminus \{\ \}$, as the mode $m_t$ of the origin trip t is necessarily allowed when considering transfers from t.

According to a second aspect shown in FIGS. 4 and 5, a method 410 computes at least one itinerary from the departure location, arrival location, and departure time for earliest arrival time queries received at step 409.

As already explained, each itinerary comprising a main part in a multimodal transportation network of predetermined stations, defined as a sequence of trips from a set of possible trips within the multimodal transportation network and transfers from a set of feasible transfers within the multimodal transportation network.

What is particular is that the itinerary is restricted to a combination of transportation modes selected among possible transportation modes of the multimodal transportation network, for instance selected by the user on the client device 2b of FIG. 1 using an interface 23b.

For allowing any transportation modes combination, step 412, implemented by the data processor 11 of the server 1, preprocesses the set of feasible transfers within the multimodal transportation network according to the first aspect, so as to obtain a subset of feasible transfers which is still compatible with any combination of selected transportation modes.

It is noted that since the preprocessing is only modified, the subsequent routing algorithm, in particular the TB algorithm, can be applied as such after. The only difference is that, at query time, only admissible trips and transfers between trips (i.e. compatible with the selected transportation modes received at step 408) should be considered for the request. Indeed, the present preprocessing simply provides a smarter pruning of transfers so that the routing algorithms become able to handle in a reliable way any combination of transportation modes. More specifically, the preprocessing guarantees that transfers, which may be useful for any query with any set of authorized transportation modes, are not pruned, so that some optimal solutions are not lost.

As already explained, the TB algorithm (or any other suitable routing algorithm) starts with an initialization phase where the set of lines L from which the destination can be reached and the set of the earliest trips that can be reached from the origin are computed. In other words, at step 414, performed by the data processor 11 of the server 1 or a data processor 21b of the client device 2b, a set of possible initial trips is determined as a function of the departure location, and a set of possible final trips is determined as a function of the arrival location, in the multimodal transportation network. At step 416, the data processor 11 of the server 1 or a data processor 21b of the client device 2b, outputs the computed itinerary. Departure time (for earliest arrival time queries) and/or departure time range (for profile queries) has also to be considered in determining origin trips and/or arrival time (for latest departure time queries) for determining final trips.

As previously explained, the method can also be considered in the context of an extension of the TB algorithm which consists in latest departure time queries wherein a desired arrival time is given instead of a start time, with the earliest possible arrival time after the start time and before the desired arrival time as a secondary criterion used to break ties.

The initialization phase can be performed in any known way.

At step 414, the suitable known routing optimization algorithm such a TB can be performed based on the sets of initial trips and final trips.

Only trips from the set of possible trips using the selected transportation modes 408 (which may be a subset of all possible transportation modes in the multimodal transportation network), and only transfers from the subset of feasible transfers between considered trips 412, are considered at step 414. Note that the selection of the combination of transportation modes may be done at this step.

Preferably, several requests could be performed so as to select a plurality of optimal itineraries, potentially corresponding to different combinations of selected transportation modes.

The itineraries selected are the optimal ones with respect to the criterion, preferably arrival time as explained, and possibly further criteria like number of transfers.

Note that for latest departure time queries, the same set of transfers as for earliest arrival time queries can be used in the search.

For example, in the TB algorithm, each earliest trip is considered only once, starting with the station of lower index in the station sequence of the trip. For each iteration, one additional trip is taken in each solution to try and get to a final trip.

In an alternate embodiment, the preprocessed set of feasible transfers may be used for constructing and evaluating time tables (e.g., for transit bus lines). Advantageously, such time tables constructed using a set of feasible transfers may be organized to avoid long waiting times between trips, and evaluated for robustness in the event of delays so that missed transfers may be minimized.

In yet another embodiment, the preprocessed set of feasible transfers may be used for managing transportation network resources (e.g., to assist in deciding which vehicles along a line should wait in the event some vehicles along the line are delayed).

A method for preprocessing a set of feasible transfers within a multimodal transportation network of predetermined stations, for each trip (t) in the multimodal transportation network between two stations of the multimodal transportation network, hereafter called origin trip, the method (a) for each station ($p_t^i$) of the origin trip (t), computes at this station ($p_t^i$) a value of an earliest arrival time ($T_A$(g m)) or an earliest change time ($\tau_C(p_t^i, m)$) associated with all transportation modes (m) of the multimodal transportation network; (b) for at least one transfer ($p_t^i \rightarrow p_u^j$) of the set of feasible transfers from a station ($p_t^i$) on the origin trip (t) to a reachable station ($p_u^j$) on a target trip (u), computes, at each station ($p_u^{k>j}$) of the target trip (u) after the reachable station ($p_u^j$), a value of the earliest arrival time ($\tau_A(p_u^{k>j}, m_u)$) or the earliest change time ($\tau_C(p_u^{k>j}, m_u)$) specifically associated with the transportation mode ($m_u$) of the multimodal transportation network used by the target trip (u), or if the transportation mode ($m_u$) of the multimodal transportation network used by the target trip (u) is the same as the transportation mode ($m_t$) of the multimodal transportation network used by the origin trip (t), a value of the earliest arrival time ($\tau_A(p_u^{k>j}, m)$) or the earliest change time ($\tau_C(p_u^{k>j}, m)$) associated with all transportation modes (m) of the multimodal transportation network; (c) removes the transfer ($p_t^i \rightarrow p_u^j$) from the set of feasible transfers only if determining that each computed value of the earliest arrival time ($\tau_A(p_u^{k>j}, m)$) or the earliest change time ($\tau_C(p_u^{k>j}, m)$) is not improved by the transfer ($p_t^i \rightarrow p_u^j$); and (d) outputs the set of feasible transfers for computing at least one itinerary in the multimodal transportation network.

The method further initializes the earliest arrival time or the earliest change time as a function of schedules.

The value of the earliest arrival time or the earliest change time specifically associated with a transportation mode ($m_u$) of the multimodal transportation network corresponds to the earliest arrival time or the earliest change time when using only the transportation mode ($m_u$) or the transportation mode ($m_t$) of the multimodal transportation network used by the origin trip (t).

The method further performs for each transfer of the set of feasible transfers which is the earliest transfer from a station on the origin trip to any reachable station on any target trip.

The method further iteratively considers the transfers from each successive station of the origin trip when travelling the stations on the origin trip from a final station to an initial station.

The earliest arrival time and/or the earliest change time is also computed at each neighboring station of each station on the origin trip and on the target trip after said reachable station.

The method further performs a routing optimization algorithm so as to build, among the itineraries having a main part from an initial trip belonging to the set of possible initial trips to a final trip belonging to the set of possible final trips, at least one optimal itinerary according to the earliest arrival time and the number of transfers or the latest departure time and the number of transfers, when considering only trips from the set of possible trips using the selected transportation modes, and only transfers from the subset of feasible transfers between considered trips.

The routing optimization algorithm may compute a Pareto front. The routing optimization algorithm may further compute at least one solution per element in the Pareto front for the earliest arrival time and number of transfers or latest departure time and number of transfers in multimodal networks by taking one additional trip of the set of the selected modes at each iteration based on the precomputed transfer set.

A method for computing at least one itinerary from a departure location to an arrival location, each itinerary comprising a main part in a multimodal transportation network of predetermined stations, defined as a sequence of trips from a set of possible trips within the multimodal transportation network and transfers from a set of feasible transfers within the multimodal transportation network, the method (a) preprocesses the set of feasible transfers within the multimodal transportation network so as to obtain a subset of feasible transfers; (b) determines a set of possible initial trips as a function of the departure location, and a set of possible final trips as a function of the arrival location, in the multimodal transportation network; and (c) performs a routing optimization algorithm so as to build, among the itineraries having a main part from an initial trip belonging to the set of possible initial trips to a final trip belonging to the set of possible final trips, at least one optimal itinerary according to the earliest arrival time and the number of transfers or the latest departure time and the number of transfers, when considering only trips from the set of possible trips using the selected transportation modes, and only transfers from the subset of feasible transfers between considered trips.

The routing optimization algorithm may compute the Pareto front. The routing optimization algorithm may further compute at least one optimal solution per element in the Pareto front for the earliest arrival time and number of transfers or latest departure time and number of transfers in multimodal networks by taking one additional trip of the set of the selected modes at each iteration based on the precomputed transfer set.

A computer program product for preprocessing a set of feasible transfers within a multimodal transportation network of predetermined stations to compute at least one itinerary from a departure location to an arrival location, the computer program product being executed on a computer to perform a process, the process (a) for each station $(p_t^i)$ of the origin trip (t), computes at this station $(p_t^i)$ a value of an earliest arrival time $(\tau_A(p_t^i, m))$ or an earliest change time $(\tau_C(p_t^i, m))$ associated with all transportation modes (m) of the multimodal transportation network; (b) for at least one transfer $(p_t^i \rightarrow p_u^j)$ of the set of feasible transfers from a station $(p_t^i)$ on the origin trip (t) to a reachable station $(p_u^j)$ on a target trip (u), computes, at each station $(p_u^{k>j})$ of the target trip (u) after the reachable station $(p_u^j)$, a value of the earliest arrival time $(\tau_A(p_u^{k>j}, m_u))$ or the earliest change time $(\tau_C(p_u^{k>j}, m_u))$ specifically associated with the transportation mode $(m_u)$ of the multimodal transportation network used by the target trip (u), or if the transportation mode $(m_u)$ of the multimodal transportation network used by the target trip (u) is the same as the transportation mode $(m_t)$ of the multimodal transportation network used by the origin trip (t), a value of the earliest arrival time $(\tau_A(p_u^{k>j}, m))$ or the earliest change time $(\tau_C(p_u^{k>j}, m))$ associated with all transportation modes (m) of the multimodal transportation network; (c) removes the transfer $(p_t^i \rightarrow p_u^j)$ from the set of feasible transfers only if determining that each computed value of the earliest arrival time $(\tau_A(p_u^{k>j}, m))$ or the earliest change time $(\tau_C(p_u^{k>j}, m))$ is not improved by the transfer $(p_t^i \rightarrow p_u^j)$; and (d) outputs the set of feasible transfers for computing at least one itinerary in the multimodal transportation network.

The process further initializes the earliest arrival time or the earliest change time as a function of schedules.

The value of the earliest arrival time or the earliest change time specifically associated with a transportation mode $(m_u)$ of the multimodal transportation network corresponds to the earliest arrival time or the earliest change time when using only the transportation mode $(m_u)$ or the transportation mode $(m_t)$ of the multimodal transportation network used by the origin trip (t).

The process further performs (b) and (c) iteratively for each transfer of the set of feasible transfers which is the earliest transfer from a station on the origin trip to any reachable station on any target trip.

The process further iteratively considers the transfers from each successive station of the origin trip when travelling the stations on the origin trip from a final station to an initial station.

The process further computes the earliest arrival time and/or the earliest change time at each neighboring station of each station on the origin trip and on the target trip after said reachable station.

The computer program product is a computer-readable medium.

A computer program product for preprocessing a set of feasible transfers within a multimodal transportation network of predetermined stations to compute at least one itinerary from a departure location to an arrival location, the computer program product being executed on a computer to perform a process, the process (a) preprocesses the set of feasible transfers within the multimodal transportation network, so as to obtain a subset of feasible transfers; (b) determines a set of possible initial trips as a function of the departure location, and a set of possible final trips as a function of the arrival location, in the multimodal transportation network; and (c) performs, a routing optimization algorithm so as to build, among the itineraries having a main part from an initial trip belonging to the set of possible initial trips to a final trip belonging to the set of possible final trips, at least one optimal itinerary according to the earliest arrival time and the number of transfers or the latest departure time and the number of transfers, when considering only trips from the set of possible trips using the selected transportation modes, and only transfers from the subset of feasible transfers between considered trips.

The routing optimization algorithm computes the Pareto set and at least one optimal solution per value in the Pareto front for the earliest arrival time and number of transfers or latest departure time and number of transfers in multimodal networks by taking one additional trip of the set of the selected modes at each iteration based on the precomputed transfer set.

The computer program product is a computer-readable medium.

It will be appreciated that variations of the above-disclosed embodiments and other features and functions, and/or alternatives thereof, may be desirably combined into many other different systems and/or applications. Also, various presently unforeseen and/or unanticipated alternatives, modifications, variations, and/or improvements therein may be subsequently made by those skilled in the art which are also intended to be encompassed by the description above and the following claims.

What is claimed is:

1. A method for electronically computing an itinerary from a departure location to an arrival location for use by a user to plan a trip travelling in a multimodal transportation network, the itinerary being defined as the departure location to an initial station of a multimodal transportation network of predetermined stations, a main part in the multimodal transportation network, a sequence of trips from a set of possible trips within the multimodal transportation network and transfers from a set of feasible transfers within the multimodal transportation network, and a final station of the multimodal transportation network to the arrival location, the method comprising:

(a) electronically preprocessing the set of feasible transfers to obtain a subset of feasible transfers;

said (a) electronically preprocessing the set of feasible transfers by (a1) for each station $(p_t^i)$ of the origin trip (t), electronically computing, using an electronic processor and electronic memory, at this station $(p_t^i)$ a value of an earliest arrival time $(\tau_A(p_t^i, m))$ or an earliest change time ($\tau_C(p_t^i, m)$) associated with all transportation modes (m) of the multimodal transportation network, (a2) for at least one transfer ($p_t^i \rightarrow p_u^j$) of the set of feasible transfers from a station ($p_t^i$) on an origin trip (t) to a reachable station ($p_u^j$) on a target trip (u), electronically computing, using an electronic processor and electronic memory, at each station ($p_u^{k>j}$) of the target trip (u) after the reachable station ($p_u^j$), a value of the earliest arrival time ($\tau_A(p_u^{k>j}, m_u)$ or the earliest change time ($\tau_C(p_u^{k>j}, m)$) specifically associated with the transportation mode ($m_u$) of the multimodal transportation network used by the target trip (u), or if the transportation mode ($m_u$) of the multimodal transportation network used by the target trip (u) is the same as the transportation mode ($m_t$) of the multimodal transportation network used by the origin trip (t), a value of the earliest arrival time ($\tau_A(p_u^{k>j}, m)$) or the earliest change time ($\tau_C(p_u^{k>j}, m)$) associated with all transportation modes (m) of the multimodal transportation network, (a3) electronically removing, using an electronic processor and electronic memory, before receiving information corresponding to a user's desired mode of transportation, the transfer ($p_t^i \rightarrow p_u^j$) from the set of feasible transfers only if determining that each computed value of the earliest arrival time ($\tau_A(p_u^{k>j}, m)$) or the earliest change time ($\tau_C(p_u^{k>j}, m)$) is not improved by the transfer ($p_t^i \rightarrow p_u^j$) and the transfer ($p_t^i \rightarrow p_u^j$) is not of a different mode of transportation, thereby preventing a transfer corresponding to a different mode of transportation from being removed from the set of feasible transfers and increasing effectiveness of computing an optimal itinerary consistent with the user's desired mode of transportation, and (a4) electronically outputting, using an electronic processor and electronic memory, the set of feasible transfers for computing at least one itinerary in the multimodal transportation network, the set of feasible transfers including transfers of all possible modes of transportation;

(b) receiving, after electronically preprocessing the set of feasible transfers, from a user, via a user interface, information corresponding to the user's desired mode of transportation;

(c) electronically determining, using an electronic processor and electronic memory, based upon the set of feasible transfers and the user's desired mode of transportation, a set of possible trips in a multimodal transportation network;

(d) electronically performing, using an electronic processor and electronic memory, a routing optimization algorithm so as to build at least one optimal itinerary, without losing an optimal itinerary corresponding to the user's desired mode of transportation, according to at least one criterion including an earliest arrival time, based upon the set of possible trips in the multimodal transportation network, the routing optimization algorithm electronically computing, using an electronic processor and electronic memory, a Pareto front; and (e) outputting to the user, via the user interface, the at least one optimal itinerary for use by the user to plan a trip travelling in the multimodal transportation network.

2. The method according to claim 1, further comprising electronically initializing, using an electronic processor and electronic memory, the earliest arrival time or the earliest change time as a function of schedules.

3. The method according to claim 1, wherein the value of the earliest arrival time or the earliest change time specifically associated with a transportation mode ($m_u$) of the multimodal transportation network corresponds to the earliest arrival time or the earliest change time when using only the transportation mode ($m_u$) or the transportation mode ($m_t$) of the multimodal transportation network used by the origin trip (t).

4. The method according to claim 2, wherein the value of the earliest arrival time or the earliest change time specifically associated with a transportation mode ($m_u$) of the multimodal transportation network corresponds to the earliest arrival time or the earliest change time when using only the transportation mode ($m_u$) or the transportation mode ($m_t$) of the multimodal transportation network used by the origin trip (t).

5. The method according to claim 1, further comprising electronically performing (c) and (d), using an electronic processor and electronic memory, iteratively for each transfer of the set of feasible transfers which is the earliest transfer from a station on the origin trip to any reachable station on any target trip.

6. The method according to claim 2, further comprising electronically performing (c) and (d), using an electronic processor and electronic memory, iteratively for each transfer of the set of feasible transfers which is the earliest transfer from a station on the origin trip to any reachable station on any target trip.

7. The method according to claim 3, further comprising electronically performing (c) and (d), using an electronic processor and electronic memory, iteratively for each transfer of the set of feasible transfers which is the earliest transfer from a station on the origin trip to any reachable station on any target trip.

8. The method according to claim 4, further comprising electronically performing (c) and (d), using an electronic processor and electronic memory, iteratively for each transfer of the set of feasible transfers which is the earliest transfer from a station on the origin trip to any reachable station on any target trip.

9. The method according to claim 5, further comprising electronically iteratively considering), using an electronic processor and electronic memory, the transfers from each successive station of the origin trip when travelling the stations on the origin trip from a final station to an initial station.

10. The method according to claim 6, further comprising electronically iteratively considering), using an electronic processor and electronic memory, the transfers from each successive station of the origin trip when travelling the stations on the origin trip from a final station to an initial station.

11. The method according to claim 7, further comprising by electronically iteratively considering), using an electronic processor and electronic memory, the transfers from each successive station of the origin trip when travelling the stations on the origin trip from a final station to an initial station.

12. The method according to claim 8, further comprising electronically iteratively considering), using an electronic processor and electronic memory, the transfers from each successive station of the origin trip when travelling the stations on the origin trip from a final station to an initial station.

13. The method according to claim 1, wherein the earliest arrival time and/or the earliest change time is also computed at each neighboring station of each station on the origin trip and on the target trip after said reachable station.

14. The method according to claim 2, wherein the earliest arrival time and/or the earliest change time is also computed at each neighboring station of each station on the origin trip and on the target trip after said reachable station.

15. The method according to claim 3, wherein the earliest arrival time and/or the earliest change time is also computed at each neighboring station of each station on the origin trip and on the target trip after said reachable station.

16. The method according to claim 4, wherein the earliest arrival time and/or the earliest change time is also computed at each neighboring station of each station on the origin trip and on the target trip after said reachable station.

17. The method according to claim 5, wherein the earliest arrival time and/or the earliest change time is also computed at each neighboring station of each station on the origin trip and on the target trip after said reachable station.

18. The method according to claim 6, wherein the earliest arrival time and/or the earliest change time is also computed at each neighboring station of each station on the origin trip and on the target trip after said reachable station.

19. The method according to claim 7, wherein the earliest arrival time and/or the earliest change time is also computed at each neighboring station of each station on the origin trip and on the target trip after said reachable station.

20. The method according to claim 8, wherein the earliest arrival time and/or the earliest change time is also computed at each neighboring station of each station on the origin trip and on the target trip after said reachable station.

21. The method according to claim 9, wherein the earliest arrival time and/or the earliest change time is also computed at each neighboring station of each station on the origin trip and on the target trip after said reachable station.

22. The method according to claim 10, wherein the earliest arrival time and/or the earliest change time is also computed at each neighboring station of each station on the origin trip and on the target trip after said reachable station.

23. The method according to claim 11, wherein the earliest arrival time and/or the earliest change time is also computed at each neighboring station of each station on the origin trip and on the target trip after said reachable station.

24. The method according to claim 12, wherein the earliest arrival time and/or the earliest change time is also computed at each neighboring station of each station on the origin trip and on the target trip after said reachable station.

25. The method according to claim 1, wherein the routing optimization algorithm computes at least one optimal solution per element in the Pareto front for the earliest arrival time and number of transfers or latest departure time and number of transfers in multimodal networks by taking one additional trip of the set of the selected modes at each iteration based on the precomputed transfer set.

26. A method for electronically computing an itinerary from a departure location to an arrival location for use by a user to plan a trip travelling in a multimodal transportation network, the itinerary being defined as the departure location to an initial station of a multimodal transportation network of predetermined stations, a main part in the multimodal transportation network, a sequence of trips from a set of possible trips within the multimodal transportation network and transfers from a set of feasible transfers within the multimodal transportation network, and a final station of the multimodal transportation network to the arrival location, the method comprising:

(a) electronically preprocessing the set of feasible transfers by removing, using an electronic processor and electronic memory, before receiving information corresponding to a user's desired mode of transportation, a transfer from the set of feasible transfers only if determining that each computed value of an earliest arrival time or an earliest change time is not improved by the transfer and the transfer is not of a different mode of transportation, thereby preventing a transfer corresponding to a different mode of transportation from being removed from the set of feasible transfers and increasing effectiveness of computing an optimal itinerary consistent with the user's desired mode of transportation;

(b) electronically outputting, using an electronic processor and electronic memory, the preprocessed set of feasible transfers for computing at least one itinerary in the multimodal transportation network;

(c) receiving, after electronically preprocessing the set of feasible transfers, from a user, via a user interface, information corresponding to a user's desired mode of transportation;

(d) electronically determining, using an electronic processor and electronic memory, based upon the preprocessed set of feasible transfers and the user's desired mode of transportation, a set of possible trips in a multimodal transportation network;

(e) electronically performing, using an electronic processor and electronic memory, a routing optimization algorithm so as to build at least one optimal itinerary, without losing an optimal itinerary corresponding to the user's desired mode of transportation, according to at least one criterion including an earliest arrival time, based upon the set of possible trips in the multimodal transportation network, the routing optimization algorithm electronically computing, using an electronic processor and electronic memory, a Pareto front; and (f) outputting to the user, via the user interface, the at least one optimal itinerary for use by the user to plan a trip travelling in the multimodal transportation network.

27. The method according to claim 26, wherein the routing optimization algorithm computes at least one optimal solution with this value per element in the Pareto front for the earliest arrival time and number of transfers or latest departure time and number of transfers in multimodal networks by taking one additional trip of the set of the selected modes at each iteration based on the precomputed transfer set.

28. A computer program product for electronically computing an itinerary from a departure location to an arrival location for use by a user to plan a trip travelling in a multimodal transportation network, the itinerary being defined as the departure location to an initial station of a multimodal transportation network of predetermined stations, a main part in the multimodal transportation network, a sequence of trips from a set of possible trips within the multimodal transportation network and transfers from a set of feasible transfers within the multimodal transportation network, and a final station of the multimodal transportation network to the arrival location, the computer program product being executed on a computer to perform a process, the process comprising:

(a) electronically preprocessing the set of feasible transfers to obtain a subset of feasible transfers;
said (a) electronically preprocessing the set of feasible transfers by (a1) for each station ($p_t^i$) of the origin trip (t), electronically computing, using the computer, at this station ($p_t^i$) a value of an earliest arrival time ($\tau_A(p_t^i, m)$) or an earliest change time ($\tau_C(p_t^i, m)$) associated with all transportation modes (m) of the multimodal transportation network, (a2) for at least one transfer ($p_t^i \rightarrow p_u^j$) of the set of feasible transfers from a station ($p_t^i$) on an origin trip (t) to a reachable station ($p_u^j$) on a target trip (u), electronically computing, using the computer, at each station ($p_u^{k>j}$) of the target trip (u) after the reachable station ($p_u^j$), a value of the earliest arrival time ($\tau_A(p_u^{k>j}, m_u)$) or the earliest change time ($\tau_C(p_u^{k>j}, m_u)$) specifically associated with the transportation mode ($m_u$) of the multimodal transportation network used by the target trip (u), or if the transportation mode ($m_u$) of the multimodal transportation network used by the target trip (u) is the same as the transportation mode ($m_t$) of the multimodal transportation network used by the origin trip (t), a value of the earliest arrival time ($\tau_A(p_u^{k>j}, m)$) or the earliest change time ($\tau_C(p_u^{k>j}, m)$) associated with all transportation modes (m) of the multimodal transportation network, (a3) electronically removing, using the computer, before receiving information corresponding to a user's desired mode of transportation, the transfer ($p_t^i \rightarrow p_u^j$) from the set of feasible transfers only if determining that each computed value of the earliest arrival time ($\tau_A(p_u^{k>j}, m)$) or the earliest change time ($\tau_C(p_u^{k>j}, m)$) is not improved by the transfer ($p_t^i \rightarrow p_u^j$) and the transfer ($p_t^i \rightarrow p_u^j$) is not of a different mode of transportation, thereby preventing a transfer corresponding to a different mode of transportation from being removed from the set of feasible transfers and increasing effectiveness of computing an optimal itinerary consistent with the user's desired mode of transportation, and (a4) electronically outputting, using the computer, the set of feasible transfers for computing at least one itinerary in the multimodal transportation network, the set of feasible transfers including transfers of all possible modes of transportation;

(b) receiving, after electronically preprocessing the set of feasible transfers, from a user, via a user interface, information corresponding to the user's desired mode of transportation;

(c) electronically determining, using the computer, based upon the set of feasible transfers and the user's desired mode of transportation, a set of possible trips in a multimodal transportation network;

(d) electronically performing, using the computer, a routing optimization algorithm so as to build at least one optimal itinerary, without losing an optimal itinerary corresponding to the user's desired mode of transportation, according to at least one criterion including an earliest arrival time, based upon the set of possible trips in the multimodal transportation network, the routing optimization algorithm electronically computing, using an electronic processor and electronic memory, a Pareto front; and (e) outputting to the user, via the user interface, the at least one optimal itinerary for use by the user to plan a trip travelling in the multimodal transportation network.

29. The computer program product according to claim 28, wherein the process further comprises initializing, using the computer, the earliest arrival time or the earliest change time as a function of schedules.

30. The computer program product according to claim 29, wherein the value of the earliest arrival time or the earliest change time specifically associated with a transportation mode ($m_u$) of the multimodal transportation network corresponds to the earliest arrival time or the earliest change time when using only the transportation mode ($m_u$) or the transportation mode ($m_t$) of the multimodal transportation network used by the origin trip (t).

31. The computer program product according to claim 28, wherein (c) and (d), using the computer, are iteratively performed for each transfer of the set of feasible transfers which is the earliest transfer from a station on the origin trip to any reachable station on any target trip.

32. The computer program product according to claim 29, wherein (c) and (d), using the computer, are iteratively performed for each transfer of the set of feasible transfers which is the earliest transfer from a station on the origin trip to any reachable station on any target trip.

33. The computer program product according to claim 30, wherein the earliest arrival time and/or the earliest change time is also computed at each neighboring station of each station on the origin trip and on the target trip after said reachable station.

34. The computer program product according to claim 28, wherein the routing optimization algorithm computes at least one optimal solution per element in the Pareto front for the earliest arrival time and number of transfers or latest departure time and number of transfers in multimodal networks by taking one additional trip of the set of the selected modes at each iteration based on the precomputed transfer set.

35. The computer program product according to claim 28, wherein the computer program product is a computer-readable medium.

36. A computer program product for electronically computing an itinerary from a departure location to an arrival location for use by a user to plan a trip travelling in a multimodal transportation network, the itinerary being defined as the departure location to an initial station of a multimodal transportation network of predetermined stations, a main part in the multimodal transportation network, a sequence of trips from a set of possible trips within the multimodal transportation network and transfers from a set of feasible transfers within the multimodal transportation network, and a final station of the multimodal transportation network to the arrival location, the computer program product being executed on a computer to perform a process, the process comprising:

(a) electronically preprocessing the set of feasible transfers by removing, using the computer, before receiving information corresponding to a user's desired mode of transportation, a transfer from the set of feasible transfers only if determining that each computed value of an earliest arrival time or an earliest change time is not improved by the transfer and the transfer is not of a different mode of transportation, thereby preventing a transfer corresponding to a different mode of transportation from being removed from the set of feasible transfers and increasing effectiveness of computing an optimal itinerary consistent with the user's desired mode of transportation;

(b) electronically outputting, using the computer, the preprocessed set of feasible transfers for computing at least one itinerary in the multimodal transportation network;

(c) receiving, after electronically preprocessing the set of feasible transfers, from a user, via a user interface, information corresponding to a user's desired mode of transportation;

(d) electronically determining, using the computer, based upon the preprocessed set of feasible transfers and the user's desired mode of transportation, a set of possible trips in a multimodal transportation network;

(e) electronically performing, using the computer, a routing optimization algorithm so as to build at least one optimal itinerary, without losing an optimal itinerary corresponding to the user's desired mode of transportation, according to at least one criterion including an earliest arrival time, based upon the set of possible trips in the multimodal transportation network, the routing optimization algorithm electronically computing, using an electronic processor and electronic memory, a Pareto front; and (f) outputting to the user, via the user interface, the at least one optimal itinerary for use by the user to plan a trip travelling in the multimodal transportation network.

37. The computer program product according to claim 36, wherein the routing optimization algorithm computes at least one solution with this value per element in the Pareto front for the earliest arrival time and number of transfers or latest departure time and number of transfers in multimodal networks by taking one additional trip of the set of the selected modes at each iteration based on the precomputed transfer set.

38. The computer program product according to claim 36, wherein the computer program product is a computer-readable medium.

39. The method according to claim 1, wherein, for the set of possible trips in the multimodal transportation network, the at least one optimal itinerary directing the user, via the user interface, to stations of the multimodal transportation network based upon the user's desired mode of transportation, wherein the at least one optimal itinerary starts with an initial trip from an initial station which is defined as an entry point of the multimodal transportation network, and ends with a final trip on a target line up to a station which is defined as an exit point of the multimodal transportation network.

40. The method according to claim 26, wherein, for the set of possible trips in the multimodal transportation network, the at least one optimal itinerary directing the user, via the user interface, to stations of the multimodal transportation network based upon the user's desired mode of transportation, wherein the at least one optimal itinerary starts with an initial trip from an initial station which is defined as an entry point of the multimodal transportation network, and ends with a final trip on a target line up to a station which is defined as an exit point of the multimodal transportation network.

41. The computer program product according to claim 28, wherein, for the set of possible trips in the multimodal transportation network, the at least one optimal itinerary directing the user, via the user interface, to stations of the multimodal transportation network based upon the user's desired mode of transportation, wherein the at least one optimal itinerary starts with an initial trip from an initial station which is defined as an entry point of the multimodal transportation network, and ends with a final trip on a target line up to a station which is defined as an exit point of the multimodal transportation network.

42. The computer program product according to claim 36, wherein, for the set of possible trips in the multimodal transportation network, the at least one optimal itinerary directing the user, via the user interface, to stations of the multimodal transportation network based upon the user's desired mode of transportation, wherein the at least one optimal itinerary starts with an initial trip from an initial station which is defined as an entry point of the multimodal transportation network, and ends with a final trip on a target line up to a station which is defined as an exit point of the multimodal transportation network.

* * * * *